(12) United States Patent
Alter (10) Patent No.: US 10,857,935 B1
(45) Date of Patent: Dec. 8, 2020

(54) TRAILER-IN-TOW WARNING SYSTEM FOR A TOWING VEHICLE

(71) Applicant: David Alter, Apopka, FL (US)

(72) Inventor: David Alter, Apopka, FL (US)

( * ) Notice: Subject to any disclaimer, the term of this patent is extended or adjusted under 35 U.S.C. 154(b) by 0 days.

(21) Appl. No.: 16/714,148

(22) Filed: Dec. 13, 2019

(51) Int. Cl.
*G08B 21/00* (2006.01)
*B60Q 1/30* (2006.01)
*H04W 4/46* (2018.01)
*H04W 4/80* (2018.01)

(52) U.S. Cl.
CPC .............. *B60Q 1/305* (2013.01); *H04W 4/46* (2018.02); *H04W 4/80* (2018.02)

(58) Field of Classification Search
CPC ........... B60Q 1/305; H04W 4/46; H04W 4/80
See application file for complete search history.

(56) References Cited

U.S. PATENT DOCUMENTS

| | | | |
|---|---|---|---|
| 4,430,637 A | 2/1984 | Koch-Ducker et al. | |
| 5,198,798 A * | 3/1993 | Lietzow | B60Q 1/305 340/12.22 |
| 5,666,103 A | 9/1997 | Davis, Jr. | |
| 6,002,330 A | 12/1999 | Brandt | |
| 6,133,851 A * | 10/2000 | Johnson | B60Q 1/30 340/901 |
| 6,211,778 B1 | 4/2001 | Reeves | |
| 6,225,918 B1 | 5/2001 | Kam | |
| 6,864,782 B1 | 3/2005 | Aaron et al. | |
| 9,493,117 B2 | 11/2016 | Shehan et al. | |
| 9,751,452 B2 | 9/2017 | Orazem | |
| 10,106,082 B2 | 10/2018 | Ebner et al. | |
| 2003/0151502 A1 | 8/2003 | Kam | |
| 2012/0191270 A1 | 7/2012 | Floyd | |
| 2013/0127638 A1* | 5/2013 | Harrison | G08G 1/166 340/903 |
| 2019/0176687 A1* | 6/2019 | Nagata | B60Q 1/52 |

FOREIGN PATENT DOCUMENTS

DE 3918341 10/1990

* cited by examiner

*Primary Examiner* — Phung Nguyen
(74) *Attorney, Agent, or Firm* — Heslin Rothenberg Farley & Mesiti P.C.; Stephen P. Scuderi (57) ABSTRACT

A trailer-in-tow warning system for a towing vehicle configured to tow a trailer. The trailer-in-tow warning system includes a trailer detection module installable in the towing vehicle. The trailer detection module includes an ignition sub-system connectable to a power supply. The ignition sub-system is operable to provide power from the power supply to the trailer-in-tow warning system when the ignition sub-system is engaged. A sensing sub-system is connectable to the ignition sub-system. The sensing sub-system is operable to generate a trailer-connected signal when a trailer has been connected to the towing vehicle. A trailer warning module is connectable to the trailer detection module. The trailer warning module is operable to receive the trailer-connected signal and to generate a warning signal to other vehicles that the towing vehicle has a trailer in tow.

21 Claims, 5 Drawing Sheets

TRAILER-IN-TOW WARNING SYSTEM FOR A TOWING VEHICLE

TECHNICAL FIELD

The present disclosure relates to warning systems for a towing vehicle. More specifically, the disclosure relates to a trailer-in-tow warning system for a towing vehicle that generates a warning signal to other vehicles that the towing vehicle has a trailer in tow.

BACKGROUND

Almost any type of vehicle (towing vehicle) may be configured to pull a trailer. However, when viewed from the rearview mirror of another vehicle, it may be difficult to determine that the towing vehicle has a trailer in tow.

Often too, when a towing vehicle passes another vehicle, the driver of the other vehicle may be unaware of the trailer in tow. For example, if the vehicle being passed is in one lane and the towing vehicle is in an adjacent lane, the trailer will be masked from the line of sight of the driver of the other vehicle by the towing vehicle as it approaches the other vehicle from the rear. Further, the trailer may be in the blind spot of the driver of the other vehicle as the towing vehicle is passing.

This may set up a potentially hazardous situation, wherein if the driver of the other vehicle decides to switch lanes, but is unaware that the trailer has not completely passed his vehicle yet. If the driver of the other vehicle attempts to pull in behind the towing vehicle before the trailer has completely passed, a collision may potentially occur. Such a potentially hazardous situation may be exacerbated when driving at night or in inclement weather.

Accordingly, when a towing vehicle is passing another vehicle, there is a need to warn the driver of the other vehicle, that the towing vehicle has a trailer in tow. There is a need to warn the other vehicle that the towing vehicle has a trailer in tow as the towing vehicle is approaching the other vehicle from the rear. Additionally, there is a need to warn the other vehicle that the towing vehicle has a trailer in tow as the towing vehicle pulls along either side of the other vehicle.

BRIEF DESCRIPTION

The present disclosure offers advantages and alternatives over the prior art by providing a trailer-in-tow warning system for a towing vehicle that generates a warning signal to other vehicles that the towing vehicle has a trailer in tow. In certain embodiments, the warning signal may be generated from a warning light or a lighted sign, either of which may be mounted on the front sides and rear sides of the towing vehicle. In certain other embodiments, the warning signal may be transmitted from a radio transmitter in the towing vehicle that is received by radio receivers in other vehicles.

A trailer-in-tow warning system for a towing vehicle configured to tow a trailer in accordance with one or more aspects of the present disclosure includes a trailer detection module and a trailer warning module. The trailer detection module is installable in the towing vehicle. The trailer detection module includes an ignition sub-system and sensing sub-system. The ignition sub-system is connectable to a power supply. The ignition sub-system is operable to provide power from the power supply to the trailer-in-tow warning system when the ignition sub-system is engaged. The sensing sub-system is connectable to the ignition sub-system. The sensing sub-system is operable to generate a trailer-connected signal when the trailer has been connected to the towing vehicle. The trailer warning module is connectable to the trailer detection module. When the trailer warning module receives the trailer-connected signal, the trailer warning module generates a warning signal to other vehicles that the towing vehicle has a trailer in tow.

A towing vehicle in accordance with one or more aspects of the present disclosure includes a trailer detection module and a trailer warning module. The trailer detection module is installable in the towing vehicle. The trailer detection module includes an ignition sub-system and a sensing sub-system. The ignition sub-system is connected to a power supply of the towing vehicle. The ignition sub-system is operable to provide power from the power supply to the trailer detection module and to the trailer warning module when the ignition sub-system is engaged. The sensing sub-system is connected to the ignition sub-system. The sensing sub-system is operable to generate a trailer-connected signal when a trailer has been connected to the towing vehicle. The trailer warning module is connected to the trailer detection module. When the trailer warning module receives the trailer-connected signal, the trailer warning module generates a warning signal to other vehicles that the towing vehicle has a trailer in tow.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
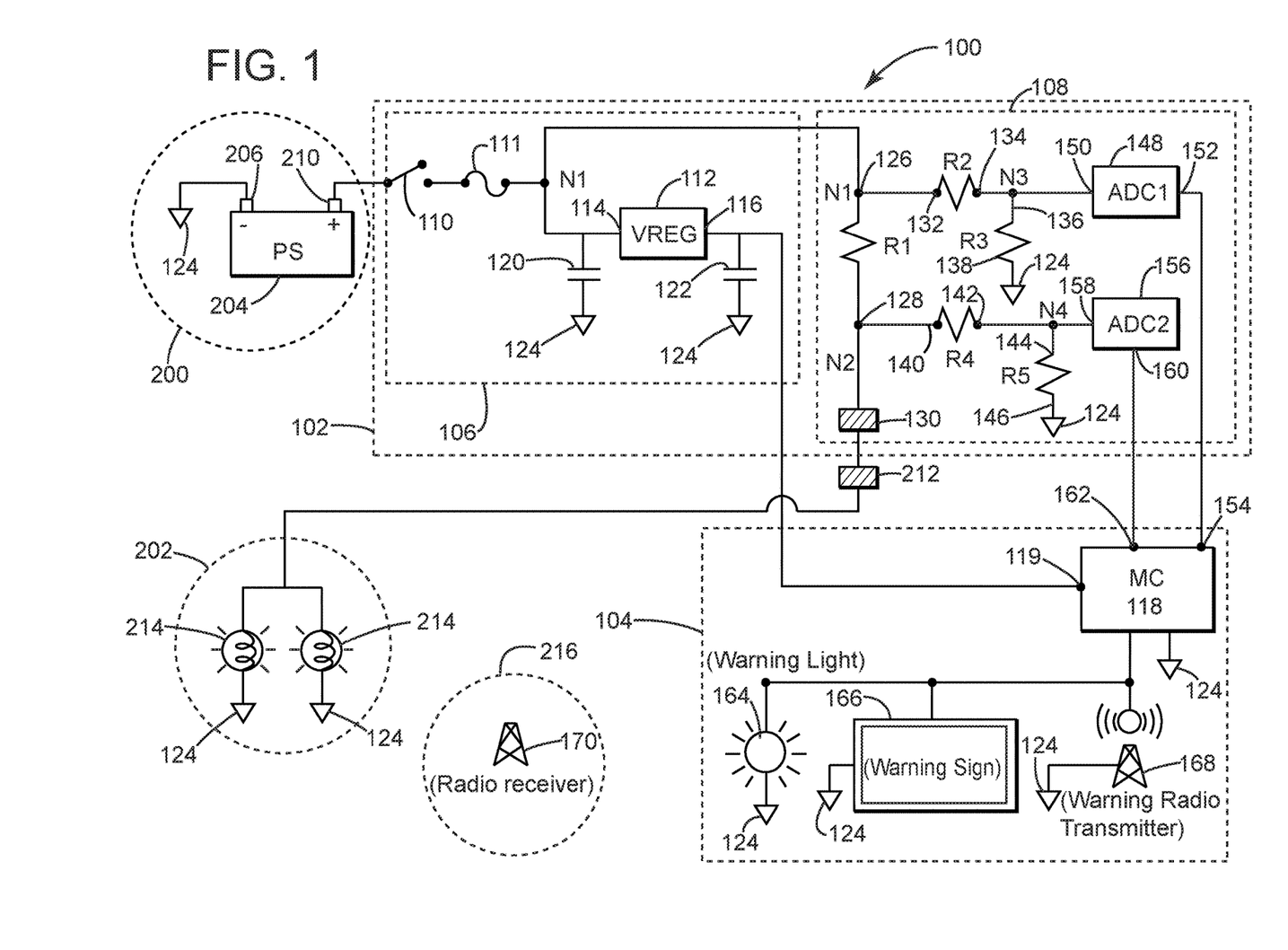
FIG. 1 depicts an example of a schematic diagram of a trailer-in-tow warning system of a towing vehicle, according to aspects described herein.

Referring to FIG. 1, an example of a schematic diagram of a trailer-in-tow warning system 100 installed in a towing vehicle 200 (see FIGS. 2-5) is depicted, according to aspects described herein. The towing vehicle 200 is configured to tow a trailer 202 (see FIGS. 2-5). The trailer-in-tow warning system 100 includes a trailer detection module 102 connectable to a trailer warning module 104. The trailer detection module 102 is configured to detect that a trailer 202 has been connected to the towing vehicle 200 and to transmit a "trailer-connected signal" to the trailer warning module 104 when the connected trailer 202 is detected. Upon receiving the trailer-connected signal, the trailer warning module 104 is configured to generate a warning signal to other vehicles that the towing vehicle 200 has a trailer 202 in tow.

In the example of FIG. 1, the trailer detection module 102 includes an ignition sub-system 106 connectable to a sensing sub-system 108. The ignition sub-system 106 is configured to supply power to the trailer-in-tow warning system 100, including supplying power to the sensing sub-system 108 and the trailer warning module 104. The sensing sub-system 108 is configured to detect the connected trailer 202 and to send the trailer-connected signal to the trailer warning module 104.

In the example of FIG. 1, the ignition sub-system 106 is connectable to a power supply 204. The power supply 204 may be a power supply of the towing vehicle 200 or a stand-along power supply associated with the trailer-in-tow warning system 100. In this example, the power supply 204 is a battery, such as a 12 volt battery, of the towing vehicle 200. A negative terminal 206 of the battery 204 is connected to a system ground 124 and a positive terminal 210 of the battery 204 is connected to the ignition sub-system 106. More specifically, in this example, the positive terminal 210 is connected to one terminal of an ignition switch 110 in the ignition sub-system 106.

The ignition sub-system 106 is operable to provide power from the power supply 204 of the towing vehicle 200 to the trailer-in-tow warning system 100 when the ignition sub-system 106 is engaged. More specifically, in this example, when the ignition sub-system 106 is engaged, the ignition switch 110 is closed and power from battery 204 conducts through the switch 110, through protective fuse 111 (or other type of protection device, such as a circuit breaker), and to a first node N1. A voltage regulator 112 within the ignition sub-system has an input 114 connected to the first node N1 and an output 116 connectable to a power input 119 of a microcontroller 118 within the trailer warning module 104. A first capacitor 120 (or other type of signal conditioning circuitry) is connected from the voltage regulator input 114 to the system ground 124 to filter the input power to the voltage regulator 112. A second capacitor 122 (or other type of signal conditioning circuitry) is connected from the voltage regulator output 116 to the system ground 124 to filter the output power generated from the regulator 112. The voltage regulator is operable to generate a supply of power at a regulated voltage to the power input 119 of microcontroller 118.

Additionally, the first node N1 is also connectable to the sensing sub-system 108 such that a supply of power from the towing vehicle power supply 204 is conducted through the first node N1 to the sensing sub-system 108. The sensing sub-system 108 is operable to generate a trailer-connected signal when the trailer 202 has been connected to the towing vehicle 200.

In the example of FIG. 1, the sensing sub-system 108 includes a first sense resistor R1 having a first resistor input 126 and output 128. The first resistor input 126 is connected to the first node N1, through which power from the power supply 204 is conducted. The first resistor output 128 connected to a second node N2.

A vehicle connector 130 is connected to the second node N2 within the sensing sub-system 108. The vehicle connector 130 is operable to be connected to a trailer connector 212 of the trailer 202. The trailer connector 212 may be connected to, for example, the trailer's tail lights 214 or a ground wire that is connected to the system ground 124 of the trailer 202.

During operation, when the trailer connector 212 is connected to the vehicle connector 130, a change in a voltage difference across the first N1 and second N2 nodes (i.e., across the first sense resistor R1) provides the trailer-connect signal to the microcontroller 118. In this example, when the trailer connector 212 is not connected to the vehicle connector 130, the voltage difference across the first sense resistor R1 is small because little to no current is conducting through R1. However, when the trailer connector 212 is plugged into the vehicle connector 130, current may flow from the vehicle power supply 204 of the towing vehicle 200 to the tail lights 214 of the trailer 202, which results in a measurably larger voltage drop across the first sense resistor R1. That measurable voltage drop is an example of a trailer-connect signal that gets processed by the circuitry in the sensing sub-system 108 and provided to the microcontroller 118 of the trailer warning module 104.

The sensing sub-system 104 also includes a second resistor R2 having a second resistor input 132 and a second resistor output 134. The second resistor input 132 is connected to the first node N1 and the second resistor output 134 is connected to a third node N3. A third resistor R3 has a third resistor input 136 and a third resistor output 138. The third resistor input 136 is connected to the third node N3 and the third resistor output 138 connected to system ground 124. The second R2 and third R3 resistors form a voltage divider circuit from the first node N1 to the third node N3 and from the third node N3 to ground 124. Accordingly, the voltage at N3 is less than the voltage at N1, when The sensing sub-system 104 also includes a fourth resistor R4 having a fourth resistor input 140 and a fourth resistor output 142. The fourth resistor input 140 is connected to the second node N2 and the fourth resistor output 142 is connected to a fourth node N4. A fifth resistor R5 has a fifth resistor input 144 and a fifth resistor output 146. The fifth resistor input 144 is connected to the fourth node N4 and the fifth resistor output 146 is connected to system ground 124. The fourth R4 and fifth R5 resistors form a voltage divider circuit from the second node N2 to the fourth node N4 and from the fourth node N4 to ground 124.

The sensing sub-system 104 also includes a first analog to digital converter (ADC) 148 having a first ADC input 150 and a first ADC output 152. The first ADC input 150 is connected to the third node N3 and the first ADC output 152 is connectable to a first signal input 154 of the microcontroller 118. A second ADC 156 has a second ADC input 158 and a second ADC output 160. The second ADC input 158 is connected to the fourth node N4 and the second ADC output 160 is connectable to a second signal input 162 of the microcontroller 118.

During operation, when the trailer connector 212 is connected to the vehicle connector 130, the voltage drop across the first sense resistor R1 (i.e., the trailer-connected signal) is proportionally reduced at the respective inputs 150, 158 of the first and second ADCs 148, 156 by the voltage divider circuits formed by the resistors R2 to R3 and by resistors R4 to R5. The first and second ADCs 148, 156 convert the trailer-connected signal to a digital format, which is sensed at the first and second signal inputs 154, 162 of the microcontroller 118.

Though the trailer detection module 102 is illustrated as shown in FIG. 1, several other types of circuits and devices may be configured to function as a trailer detection module to electrically sense the presence of a trailer 202, when the towing vehicle 200 is electrically and/or physically connected to the trailer 202. For example, the trailer detection module 102 may include transistorized circuitry to replace any one or several of the circuits in the ignition sub-system 106 and sensing sub-system 108. Alternatively, the trailer detection module 102 may include radar or lidar technology to electrically sense the presence of the trailer 202 when the trailer 202 is electrically and/or physically connected to the towing vehicle 200. Alternatively, the trailer detection module 102 may not electrically sense the presence of a trailer 202, when the towing vehicle 200 is electrically and/or physically connected to the trailer 22. Rather, the trailer detection module 102 may be a manually activated system, such as a manually activated switch, that a driver may activate, when the driver determines that the trailer 202 has been attached electrically and/or physically to the towing vehicle 200.

Once the microcontroller 118 receives the trailer-connected signal, the microcontroller 118 is operable to control any number of signaling devices that may generate a warning signal to other vehicles that the towing vehicle 200 has the trailer 202 in tow. For example, the signaling devices may be a warning light 164, a warning sign 166 and/or a warning radio transmitter 168. The microcontroller 118 may include any one of several commercially available microcontrollers. For example, the microcontroller 118 may be one of several microcontroller models sold by Microchip Technology, Inc. of Phoenix, Ariz., USA.

In the case of a warning light 164 utilized to generate the warning signal, the warning light may 164 be mounted on the front 218, the right front side 220, the right rear side 221, the left front side 222 and/or the left rear side 223 of the towing vehicle 200 (see FIGS. 2-5). The warning light 164 may be a light of distinctive color, for example, yellow or purple, that is not used for any other purpose on the road, so as not to be confused with lights used by law enforcement, emergency medical services or the like. Additionally, the warning light 164 may be a flashing, rotating or blinking light. The warning light may comprise a pattern of lights, or may comprise a distinctive or fanciful mark, symbol or picture that is indicative of the towing vehicle 200 towing a trailer 202.

In the case of a warning sign 166 utilized to generate the warning signal, the warning sign also may be mounted on the front 218, the right front side 220, the right rear side 221, the left front side 222 and/or the left rear side 223 of the towing vehicle 200 (see FIGS. 2-5). The warning sign 166 may provide, for example, a simple warning, such as: "Warning-Trailer In Tow." Alternatively, the warning sign may be programmable, enabling a driver to program additional information into the warning sign 166. For example, a driver of the towing vehicle 200 may program dimensional information of the trailer 202 into the warning sign 166, such as length, width and height.

In the case of a warning radio transmitter 168 utilized to generate the warning signal, the trailer-in-tow warning system 100 may also include a radio receiver 170 (see FIGS. 3-5) installable in other vehicles 216 (see FIGS. 3-5) in the proximity of the towing vehicle 200 that is operable to receive the warning signal. The radio transmitter 168 and radio receiver 170, may be a Bluetooth radio transmitter and a Bluetooth radio receiver respectively.

Alternatively, the radio receiver 170 of the trailer-in-tow warning system 100 may be installable in a mobile device (such as a cell phone, lap-top computer or the like) that the driver of the other vehicle 216 may bring into the other vehicle 216. The warning signal transmitted from the transmitter 168 may be an audio warning that can be transmitted through an audio system of the other vehicle 216 or mobile device, or may also be a video warning that can be displayed on a video display system of the other vehicle 216 or mobile device, when the towing vehicle 200 gets near the other vehicle 216.

Though the trailer warning module 104 is illustrated as shown in FIG. 1, several other types of circuits and devices may be configured to function as a trailer detection module. For example, the trailer detection module 104 may include various integrated circuitry to replace the microcontroller 118. Alternatively, the trailer warning module 104 may include various combinations of discrete circuit components such as resistors, transistors, switches, diodes, capacitors, inductors and the like to activate one or more warning devices such as the warning light 164, warning sign 166 or warning radio transmitter 168.

Figure 2:
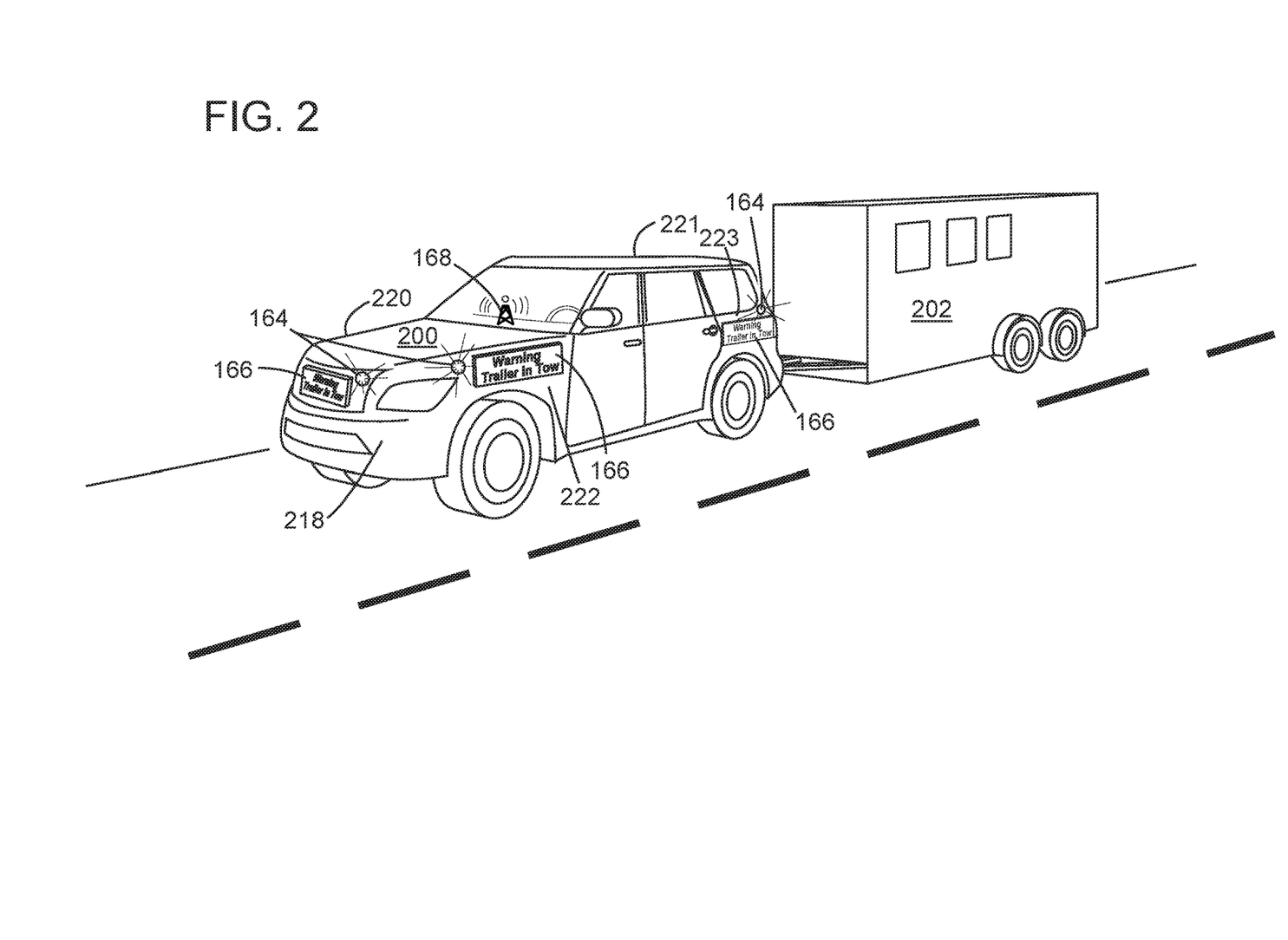
FIG. 2 depicts a perspective view of an example of a towing vehicle with a trailer in tow, the towing vehicle having the trailer-in-tow warning system of FIG. 1 installed therein, according to aspects described herein.
Figure 3:
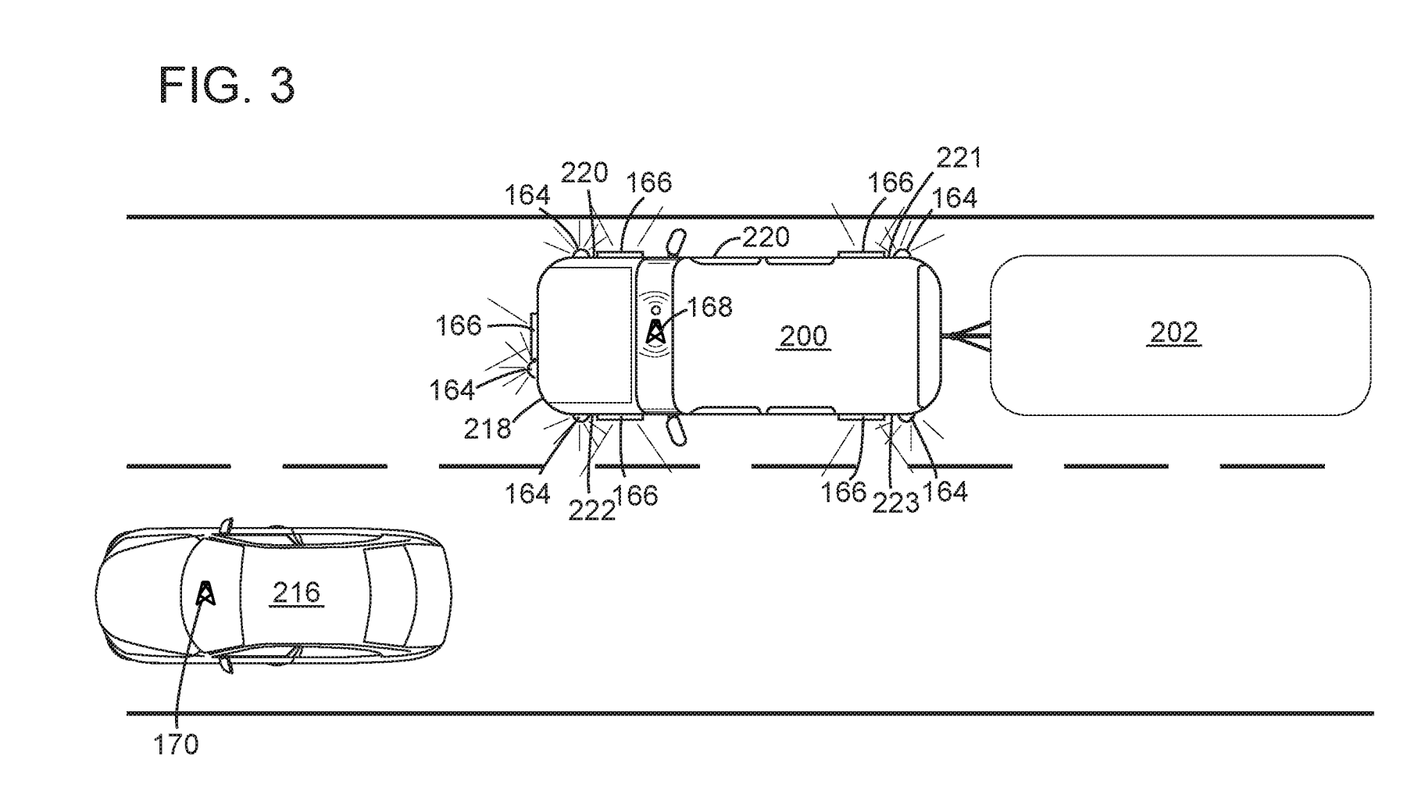
FIG. 3 depicts a top view of an example of the towing vehicle and trailer of FIG. 2 that is in the process of passing the other vehicle from behind, according to aspects described herein.

Referring to FIG. 2, a perspective view of an example of a towing vehicle 200 with a trailer in tow 202 is depicted according to aspects described herein. Referring also to FIG. 3, a top view of an example of the towing vehicle 200 with the trailer in tow 202 of FIG. 2 that is in the process of passing another vehicle 216 from behind, is depicted according to aspects described herein. The towing vehicle 200 has the trailer-in-tow warning system 100 (see FIG. 1) installed therein.

Various visual warning devices, such as the warning light 164 and warning sign 166, may be mounted on the front 218, the right front side 220, the right rear side 221, the left front side 222 and the left rear side 223 to maximize the visibility of the warning signal as the towing vehicle 200 approaches the other vehicle 216 being passed. As the towing vehicle 200 approaches from behind, the visual warning devices 164, 166 on the front 218 of the towing vehicle 200 are most readily visible to the driver of the other vehicle 216 through the rearview mirror.

Figure 4:
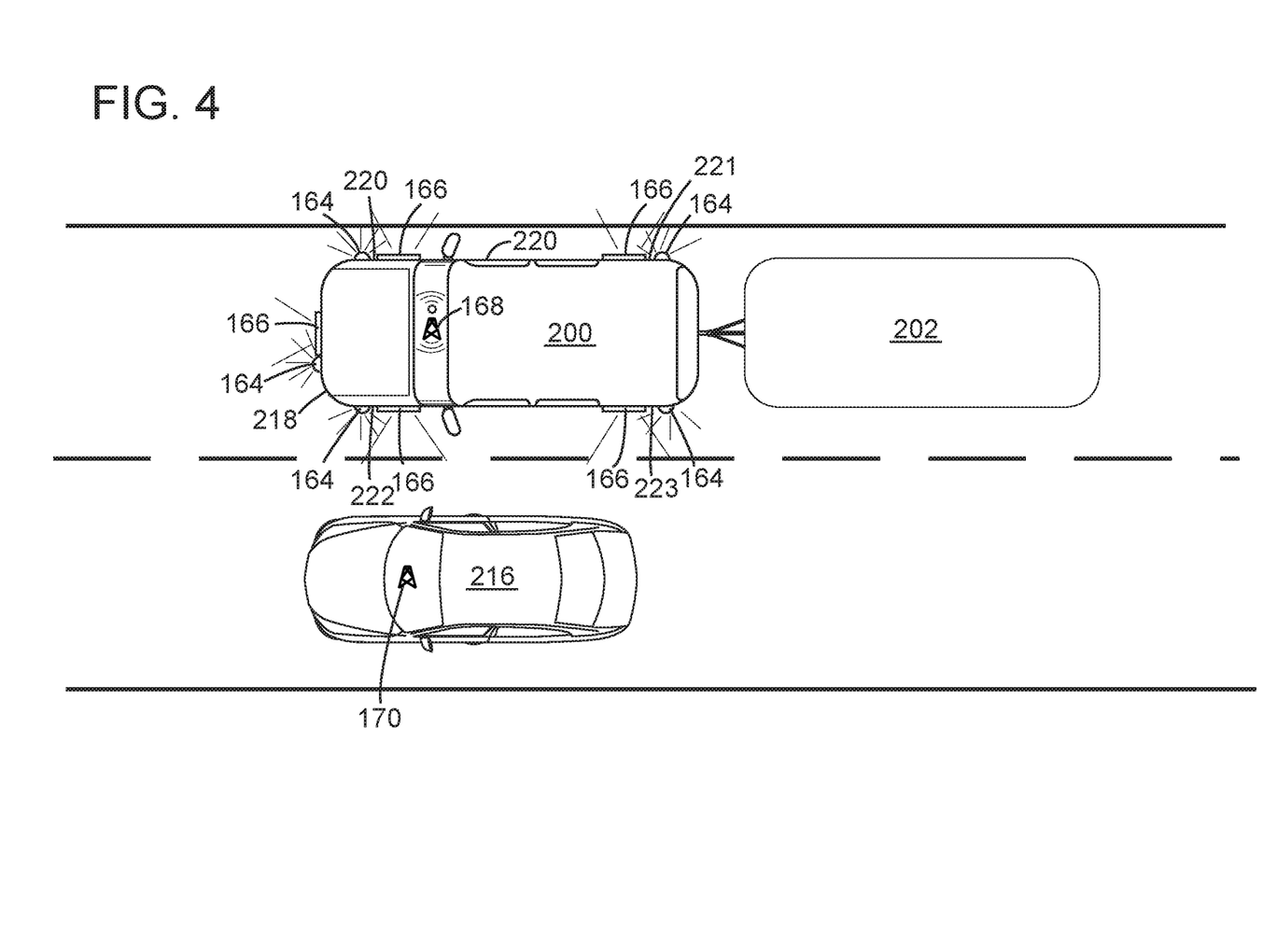
FIG. 4 depicts a top view of an example of the towing vehicle and trailer of FIG. 2, wherein the towing vehicle has pulled along-side of the other vehicle being passed, according to aspects described herein.

Referring to FIG. 4, a top view of an example of the towing vehicle 200 and trailer 202 is depicted, wherein the towing vehicle has pulled along-side of the other vehicle 216. As the towing vehicle 200 pulls along-side of the other vehicle 216 in the process of passing to the right of the vehicle 216, the visual warning devices 164, 166 on the left front side 222 and left rear side 223 of the towing vehicle are most readily visible to the driver of the other vehicle 216. If the towing vehicle 200 were to pass to the left side of the vehicle 216, the visual warning devices 164, 166 on the right front side 220 and the right rear side 221 of the towing vehicle 200 would be most readily visible to the driver to the other vehicle 216.

Accordingly, whether the towing vehicle is approaching from behind, or passing on either the right or left of the other vehicle 216, the visual warning devices (such as a warning light 164 or a warning sign 166) are always in the line of sight of the driver of the other vehicle. This is the case even if the trailer 202 is not in clear view of the driver of the other vehicle 216.

Though the towing vehicle 200 is illustrated herein as having a warning light 164 and a warning sign 166 on the front 218, right front side 220, right rear side 221, left front side 222 and left rear side 223 of towing vehicle 200, any number or combination of visual warning devices may be placed on any number of sides or surfaces of vehicle 200. For example, just warning lights 164 may be placed on the front side 218, right front side 220 and left front side 222 of towing vehicle 200. Alternatively by example, a single warning sign 166, or a single warning light 164, may be placed on the front side 218 only of the towing vehicle 200. Additionally by example, a single warning sign 166 may be placed on the front side 218 and a pair of warning lights 164 may be placed on both the right rear side 221 and left rear side 223 of the towing vehicle 200. Additionally, by example, a visual warning device, such as warning light 164 or warning sign 166, may be placed on the roof of the towing vehicle 200. Additionally, by example, the visual warning devices may be any number or combination of distinctive or fanciful patterns of lights, marks, symbols or pictures that are indicative of the towing vehicle 200 towing a trailer 202.

If the warning device were a warning radio transmitter 168, such as a Bluetooth radio transmitter, installed in the towing vehicle 200 then the warning signal can be received by a radio receiver 170, such as a Bluetooth radio receiver 170, installable in the other vehicle 216 regardless of the relative positions of the two vehicles. Alternatively, the radio receiver 170, may be installable in a mobile device (such as a cell phone, a lap-top computer or the like) that the driver of the other vehicle may bring into the other vehicle. As such, the warning radio transmitter 168 can transmit a video or audio warning signal to the other vehicle 216 or mobile device, that could be shown or heard on an audio system or video display system of the other vehicle 216 or mobile device.

Figure 5:
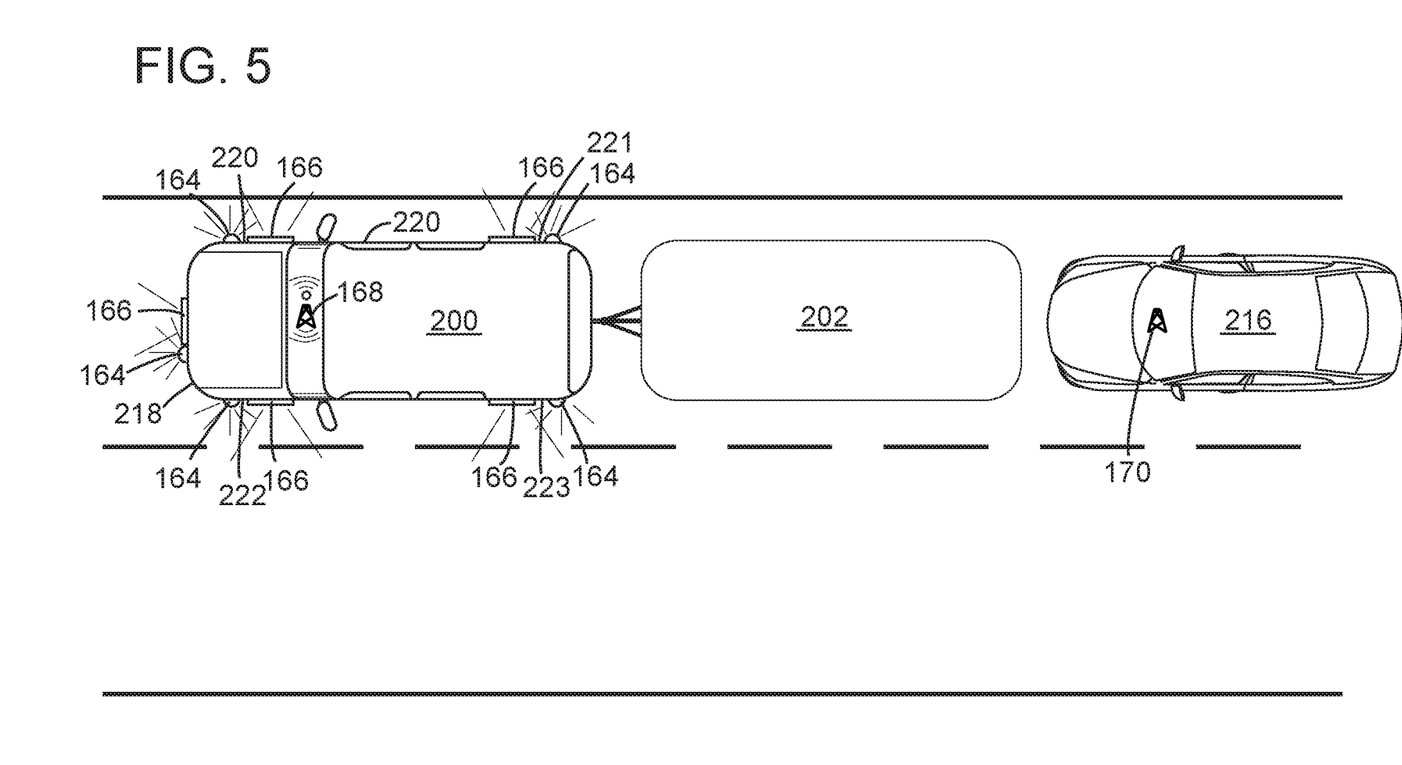
FIG. 5 depicts a top view of an example of the towing vehicle and trailer of FIG. 2, wherein the towing vehicle has passed the other vehicle and the other vehicle has pulled behind the trailer, according to aspects described herein.

Referring to FIG. 5, a top view of an example of the towing vehicle 200 and trailer 202 is depicted, wherein the towing vehicle 200 has passed the other vehicle 216 and the other vehicle 216 has pulled safely behind the trailer 201. Even though the trailer 216 may not be in the line of sight of the driver of the other vehicle 216 when the towing vehicle 200 is passing, the warning signals from one or more of the warning devices 164, 166, 168 have given the driver of the other vehicle 216 ample warning of the trailer 202 in tow. Accordingly, the driver of the other vehicle 216 has waited for the towing vehicle 200 and trailer 202 to safely and completely pass, before pulling in behind the trailer 202.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A trailer-in-tow warning system for a towing vehicle configured to tow a trailer, the trailer-in-tow warning system comprising:
    a trailer detection module installable in the towing vehicle, the trailer detection module comprising:
        an ignition sub-system connectable to a power supply, the ignition sub-system operable to provide power from the power supply to the trailer-in-tow warning system when the ignition sub-system is engaged, the ignition sub-system comprising:
            an ignition switch having an input connectable to the power supply and an output connected to a first node, and
            a voltage regulator having an input connected to the first node and an output operable to generate a regulated voltage, and
        a sensing sub-system connectable to the first node of the ignition sub-system such that a supply of power from the power supply is conducted through the first node to the sensing subsystem, the sensing sub-system operable to generate a trailer-connected signal when the trailer has been connected to the towing vehicle; and
    a trailer warning module connectable to the trailer detection module, the trailer warning module comprising a microcontroller connectable to the output of the voltage regulator, the microcontroller being operable to receive the trailer-connected signal and to control the output of one of a warning light, lighted sign and radio transmitter;
    wherein when the trailer warning module is configured to receive the trailer-connected signal, the trailer warning module is configured to generate a warning signal to other vehicles that the towing vehicle has the trailer in tow.

2. The trailer-in-tow warning system of claim 1, wherein the trailer warning module comprises the warning light mounted on both front sides and both rear sides and front of the towing vehicle.

3. The trailer-in-tow warning system of claim 2, wherein the warning light comprises a blinking light.

4. The trailer-in-tow warning system of claim 2, wherein the warning light comprises one of a yellow light and a purple light.

5. The trailer-in-tow warning system of claim 1, wherein the trailer warning module comprises the lighted sign mounted on both front sides and both rear sides of the towing vehicle.

6. The trailer-in-tow warning system of claim 5, wherein the lighted sign comprises a programmable lighted sign.

7. The trailer-in-tow warning system of claim 1, wherein the trailer warning module comprises the radio transmitter for transmitting a warning message.

8. The trailer-in-tow warning system of claim 7, comprising a radio receiver for receiving the warning message from the radio transmitter, the radio receiver being installable in one of the other vehicles and a mobile device.

9. The trailer-in-tow warning system of claim 8, wherein the radio receiver comprises a Bluetooth radio receiver.

10. The trailer-in-tow warning system of claim 7, wherein the radio transmitter comprises a Bluetooth radio transmitter.

11. The trailer-in-tow warning system of claim 1, wherein the sensing sub-system includes a voltage sense device connected to the first node, wherein a voltage difference across the voltage sense device comprises the trailer-connect signal.

12. The trailer-in-tow warning system of claim 1, wherein the sensing sub-system comprises:
a first sense resistor having a first resistor input and output, the first resistor input connected to the first node, the first resistor output connected to a second node;
a second resistor having a second resistor input and output, the second resistor input connected to the first node, the second resistor output connected to a third node;
a third resistor having a third resistor input and output, the third resistor input connected to the third node, the third resistor output connected to a ground;
a fourth resistor having a fourth resistor input and output, the fourth resistor input connected to the second node, the fourth resistor output connected to a fourth node; and
a fifth resistor having a fifth resistor input and output, the fifth resistor input connected to the fourth node, the fifth resistor output connected to the ground.

13. The trailer-in-tow warning system of claim 12, wherein the sensing sub-system comprises:
a first analog to digital converter (ADC) having a first ADC input and output, the first ADC input connected to the third node and the first ADC output connectable to a first input of the microcontroller; and
a second ADC having a second ADC input and output, the second ADC input connected to the fourth node and the second ADC output connectable to a second input of the microcontroller.

14. The trailer-in-tow warning system of claim 13, wherein the sensing sub-system comprises:
a vehicle connector connected to the second node, the vehicle connector operable to be connected to a trailer connector of the trailer, the trailer connector connected to one of a tail light and a ground wire of the trailer;
wherein, when the trailer connector is connected to the vehicle connector, a change in a voltage difference across the first and second nodes provides the trailer-connect signal to the microcontroller.

15. The trailer-in-tow warning system of claim 1, wherein the power supply is a power supply of the towing vehicle.

16. A towing vehicle comprising:
a trailer detection module installed in the towing vehicle, the trailer detection module comprising:
an ignition sub-system connected to a power supply of the towing vehicle, the ignition sub-system operable to provide power from the power supply to the trailer detection module and to a trailer warning module when the ignition sub-system is engaged, the ignition sub-system comprising:
an ignition switch having an input connected to the power supply and an output connected to a first node, and
a voltage regulator having an input connected to the first node and an output operable to generate a regulated voltage, and
a sensing sub-system connected to the first node of the ignition sub-system such that a supply of power from the power supply is conducted through the first node to the sensing subsystem, the sensing sub-system operable to generate a trailer-connected signal when a trailer has been connected to the towing vehicle; and
a trailer warning module connected to the trailer detection module, the trailer warning module comprising a microcontroller connected to the output of the voltage regulator, the microcontroller being operable to receive the trailer-connected signal and to control the output of one of a warning light, lighted sign and radio transmitter;
wherein when the trailer warning module is configured to receive the trailer-connected signal, the trailer warning module is configured to generate a warning signal to other vehicles that the towing vehicle has the trailer in tow.

17. The towing vehicle of claim 16, wherein the trailer warning module comprises one of:
the warning light mounted on both front sides and both rear sides of the towing vehicle;
the lighted sign mounted on both front sides and both rear sides of the towing vehicle; and
the radio transmitter for transmitting a warning message to a radio receiver, the radio receiver installable in one of another vehicle and a mobile device.

18. The towing vehicle of claim 17, wherein the warning light comprises a blinking light.

19. The towing vehicle of claim 17, wherein the warning light comprises one of a yellow light and a purple light.

20. The towing vehicle of claim 17, wherein the lighted sign comprises a programmable lighted sign.

21. The towing vehicle of claim 17, wherein the radio transmitter comprises a Bluetooth radio transmitter.

* * * * *